Patented Dec. 31, 1946

2,413,624

UNITED STATES PATENT OFFICE 2,413,624

HARDENABLE UREA-ALDEHYDE RESINS

Raymond R. Harris, Stamford, Conn., assignor to American Cyanamid Company, New York, N. Y., a corporation of Maine No Drawing. Application October 5, 1943,
Serial No. 505,032

8 Claims. (Cl. 260—39)

This invention relates to substantially stable compositions containing a urea-aldehyde resin and a curing catalyst.

The production of dry urea-formaldehyde resins which have curing catalysts incorporated therein, has been for many years a very difficult problem in the plastics field. This problem is especially acute in the field of urea-formaldehyde resin adhesives of the cold-setting variety. Among the difficulties encountered are caking of the dry resin during storage because the potentially acidic nature of the curing catalysts which have heretofore been used has caused the resin to become partially polymerized. Another difficulty is that many substances which set free acid upon the addition of water to the dry resin containing the catalyst are so active that the resulting solution gels or becomes too viscous to use as a glue or for coating or impregnating purposes in an extremely short time. Other substances which have been used do not produce sufficient acidity to cause the resin to cure thoroughly at low temperatures and in some cases such catalysts do not cause the resin to cure even after a considerable time at somewhat elevated temperatures. These substances are, of course, unsuitable for use in cold-set adhesives.

An object of the present invention is to provide curing catalysts for urea-aldehyde resins which will cause the latter to cure rapidly in aqueous solution.

Another object of this invention is to provide urea-formaldehyde resin compositions, including a curing catalyst, which compositions are substantially stable upon storage at ordinary temperatures for a considerable period of time, e. g., six months-one year.

Still another object of my invention is to provide a urea-formaldehyde resin adhesive, including a curing catalyst, which adhesive has a sufficient working life to be used commercially.

A further object of my invention is to provide a urea-formaldehyde resin adhesive, including a curing catalyst, which adhesive exhibits high shear strength when applied to wooden surfaces particularly after being wet.

These and other objects are attained by incorporating a small proportion of an ammonium salt of a complex inorganic acid containing fluorine, e. g., ammonium silicofluoride, ammonium borofluoride, etc., into a hardenable condensation product of a urea and an aldehyde.

The following examples in which the proportions are in parts by weight are given by way of illustration and not in limitation.

Example 1

| | Parts |
|---|---|
| Spray-dried urea-formaldehyde resin | 835 |
| Walnut shell flour | 87 |
| Wood flour | 38 |
| Tricalcium phosphate | 20 |
| Ammonium silicofluoride | 20 |

These substances are blended together to form a homogeneous, stable, dry adhesive.

The adhesives prepared according to this example may be mixed with water in a ratio of about 65 parts of water to 100 parts of resin adhesive. Such adhesive mixtures have a working life of about 2–4 hours or more at about 70° F., completely harden in about 12 hours after application to wood surfaces to be joined, and they have a maximum glue line acidity of about pH 3. Plywood bonded with a resin mixture of the type described has a shear strength when dry of about 490 pounds per square inch and when wet it has a strength of about 366 pounds per square inch. In many instances, higher strengths are obtained. The plywood is soaked for about 48 hours in water at room temperature prior to determining the "wet shear strength." It is to be noted that plywood bonded with my adhesives is very water resistant.

Example 2

| | Parts |
|---|---|
| Spray-dried urea-formaldehyde resin | 83 |
| Walnut shell flour | 13 |
| Tricalcium phosphate | 2 |
| Ammonium silicofluoride | 2 |

This mixture is blended in the same manner as that described in Example 1 thereby producing a urea-formaldehyde resin having similar desirable properties.

Ammonium borofluoride can be substituted for the ammonium silicofluoride used in the above examples. Ammonium borofluoride is somewhat less active than ammonium silicofluoride and accordingly is desirable for use in summer months when ordinary temperatures are higher than in other parts of the year.

My curing catalysts may be buffered by the addition of other substances, such as sodium formate, sodium acetate, disodium phosphate, sodium sulphite, etc.

Any desired hardenable condensation product of a urea and formaldehyde may be used in accordance with my invention but water-soluble urea-aldehyde condensation products or resins are preferred. The term "water-soluble urea-aldehyde condensation products or resins" as used herein is intended to include those condensation products or resins which form colloidal solutions or dispersions as well as true solutions. Any resin-forming urea may be employed, e. g., urea, thiourea, ethylurea, etc. Any aldehyde may be employed, e. g., formaldehyde, benzaldehyde, furfural, etc. Furthermore, mixtures of urea and thiourea or other ureas may be used as well as mixtures of aldehydes, such as, for example, mixtures of formaldehyde and furfural.

In some instances, it may be desirable to modify the urea-aldehyde resins with other substances which are reactive with aldehydes to form resins, e. g., aniline, phenol, resorcinol, the cresols, the xylenols, etc.

The resin employed in accordance with the foregoing examples may be prepared by refluxing urea with aqueous solution containing about 37% of formaldehyde in a ratio of about 2 mols of formaldehyde to 1 mol of urea at a pH initially adjusted to about pH 7.7–7.8 (glass electrode) for about 15 minutes. Sufficient urea is then added to bring the molal ratio of formaldehyde with urea down to about 1.75:1, the pH is adjusted to about 5.7–5.8 and the reacting mixture refluxed until a viscosity of 70 centipoises is obtained. The pH of the resinous syrup thus produced is adjusted to about 7.8–8 and the mixture is spray-dried.

The pH adjustments may be made by use of sodium hydroxide or formic acid as required.

Urea-formaldehyde resin adhesives should preferably contain at least 70% of resin, from about 0–20% of walnut shell flour, any portion or all of which may be replaced by wood flour if desired and about ½–5% of curing catalyst such as ammonium silicofluoride or ammonium borofluoride. In order to obtain a free flowing, non-caking adhesive, it is desirable to incorporate about 1–4% of some anti-caking agent such as tricalcium phosphate. Furthermore, gums, starches, dispersing agents or wetting agents may be included in my adhesive compositions if desirable. My adhesives are suitable for plywood manufacture and also for joining wooden surfaces generally. They may also be used as adhesives for joining a wide variety of surfaces including cellulosic sheets used in manufacturing paper-board.

Different urea-formaldehyde resins possess widely varying reactivities and this is magnified by the use of conventional catalysts such as ammonium chloride, whereas the differences are not so great if my catalysts be used.

My adhesives have an additional advantage over conventional adhesives in that they are vermin-proof since the ammonium salts which I employ as catalysts have insecticidal and insect repellent properties.

The so-called glue line pH of my adhesives is above the minimum of 2.5 set by government specifications. On the other hand, the glue line pH is sufficiently low to insure thorough cure of the resin adhesive.

My curing catalysts are also suitable for use in molding compositions comprising urea-formaldehyde resins and fillers as well as for use in laminating syrups for the production of laminated paper or laminated cloth sheets. My catalysts are advantageously used without the application of high temperatures and high pressures as in the production of laminated materials, but they may also be used in the high pressure and high temperature operations if desirable. Excellent core molds are easily made by the use of a urea-formaldehyde resin binder containing my catalysts.

Another application for my catalysts is in water paints containing urea-formaldehyde resins and these paints may have suitable fillers, dyes, pigments and extenders incorporated therein.

My catalysts are also useful in coating or impregnating compositions for use in the treatment of textiles, paper, leather and other fibrous materials.

In any of the aforementioned applications of my catalysts, about ½–5% of the catalyst is employed, based upon the resin content.

Obviously any modification and variations of compositions and processes described herein may be made without departing from the spirit and scope of the invention as defined in the appended claims.

I claim:

1. A hardenable condensation product of a urea and an aldehyde intimately mixed with a curing catalyst which is selected from the group consisting of ammonium silicofluoride and ammonium borofluoride.

2. A water-soluble condensation product of a urea and an aldehyde intimately mixed with ammonium silicofluoride as a curing catalyst.

3. A water-soluble condensation product of a urea and an aldehyde intimately mixed with ammonium borofluoride as a curing catalyst.

4. An adhesive including a dry water-soluble urea-formaldehyde resin containing about 0.5–5% of ammonium silicofluoride as a curing catalyst intimately mixed therewith.

5. A water-soluble urea-formaldehyde resin intimately mixed with ammonium silicofluoride as a curing catalyst.

6. A water-soluble urea-formaldehyde resin intimately mixed with ammonium silicofluoride as a curing catalyst and including tricalcium phosphate in a pulverulent state.

7. An adhesive including a major proportion of a dry water-soluble urea-formaldehyde resin and a minor proportion of a filler, and containing intimately mixed therewith about 2% of ammonium silicofluoride as a curing catalyst.

8. A composition of matter in the form of a dry powder, comprising in combination a pulverulent water-soluble urea-formaldehyde condensation product and a curing catalyst therefor comprising ammonium silicofluoride.

RAYMOND R. HARRIS.